United States Patent
Duan et al.

(10) Patent No.: US 9,559,610 B2
(45) Date of Patent: Jan. 31, 2017

(54) METHOD TO GENERATE MULTILEVEL INVERTER MODULATION CONTROL SIGNALS

(71) Applicant: Mitsubishi Electric Research Laboratories, Inc., Cambridge, MA (US)

(72) Inventors: Chunjie Duan, Brookline, MA (US); Koon Hoo Teo, Lexington, MA (US); Rui Ma, Somerville, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 197 days.

(21) Appl. No.: 14/503,751

(22) Filed: Oct. 1, 2014

(65) Prior Publication Data

US 2016/0099661 A1 Apr. 7, 2016

(51) Int. Cl.
*H02M 7/483* (2007.01)
*H02M 7/487* (2007.01)
*H02M 7/5387* (2007.01)

(52) U.S. Cl.
CPC .............. *H02M 7/487* (2013.01); *H02M 7/483* (2013.01); *H02M 2007/53876* (2013.01)

(58) Field of Classification Search
CPC ........ H02M 7/483; H02M 7/487; H02M 7/49; H02M 7/42; H02M 7/538; H02M 7/537; H02M 2007/4835; H02M 2007/53876; H02M 2001/0003; H02M 5/458
USPC ............. 363/131, 123, 37, 39, 13, 124, 126, 41,363/34, 40, 95, 71
See application file for complete search history.

(56) References Cited

U.S. PATENT DOCUMENTS

| | | | | |
|---|---|---|---|---|
| 6,031,738 A | * | 2/2000 | Lipo | H02M 7/487 363/37 |
| 6,653,812 B1 | * | 11/2003 | Huo | H02M 7/53875 318/801 |
| 7,558,089 B2 | | 7/2009 | Mese et al. | |
| 8,564,994 B2 | * | 10/2013 | Capitaneanu | H02M 7/487 363/132 |
| 9,083,230 B2 | * | 7/2015 | Narimani | H02M 3/07 |
| 2002/0172058 A1 | * | 11/2002 | Szczesny | H02M 7/487 363/40 |

(Continued)

OTHER PUBLICATIONS

P. N. Tekwani, R. S. Kanchan, K. Gopakumar; "Current-error space-vector-based hysteresis PWM controller for three-level voltage source inverter fed drives"; Sep. 9, 2005; IEE Proceedings—Electric Power Applications; vol. 152; pp. 1283-1295.*

(Continued)

*Primary Examiner* — Timothy J Dole
*Assistant Examiner* — Shahzeb K Ahmad
(74) *Attorney, Agent, or Firm* — Gene Vinokur; James McAleenan; Hironori Tsukamoto

(57) ABSTRACT

A method generates space vector modulation signals for a multi-level power inverter using space vector pulse width modulation (SVPWM). A reference voltage and a triangle region for the reference voltage are determined. Vertices for a space vector that is closest to the reference voltage is outputted. Then, the vertices are adjusted so that the space vector is in a valid region of the triangle region. Lastly, the space vector modulation signals a, b, and c corresponding to the space vector in the valid region are outputted.

7 Claims, 8 Drawing Sheets

(56) References Cited

U.S. PATENT DOCUMENTS

| | | | |
|---|---|---|---|
| 2006/0245216 A1* | 11/2006 | Wu | H02M 7/487 363/13 |
| 2012/0147639 A1* | 6/2012 | Mao | H02M 7/493 363/98 |
| 2014/0016382 A1 | 1/2014 | Teo et al. | |
| 2014/0050000 A1 | 2/2014 | Teo et al. | |
| 2015/0194902 A1* | 7/2015 | Tian | H02M 5/458 363/37 |

OTHER PUBLICATIONS

Yongdong Li, Yue Gao, Xuan Hou; "A general SVM algorithm for multilevel converters considering zero-sequence component control"; Nov. 6-10, 2005; IEEE; pp. 508-513.*

Nguyen Phung Quang, Jörg-Andreas Dittrich; "Vector Control of Three-Phase AC Machines"; 2008; Springer Berlin Heidelberg; pp. 17-59; ISBN: 978-3-540-79028-0; Online ISBN: 978-3-540-79029-7.*

* cited by examiner

METHOD TO GENERATE MULTILEVEL INVERTER MODULATION CONTROL SIGNALS

FIELD OF THE INVENTION

This invention relates generally to power inverters, and more particularly to controlling multilevel power inverters.

BACKGROUND OF THE INVENTION

Power inverters can greatly improve the overall efficiency, performance and quality of signals of a power system. Conventionally, two-level inverters are widely used for their low cost and minimal complexity. However, high voltage stress, high harmonic distortions, and instantaneous voltage change rate are some of the challenges facing a two level inverters.

Multilevel (ML) inverters can potentially address these challenges. ML inverters can be used for high-power, high voltage applications due to inherent advantages, such as reduced voltage stress, lower harmonics, lower instantaneous voltage change rate dv/dt and lower common-mode voltage. Modular multilevel converters are used for renewable energy applications. ML inverters are extensively used in high-power applications with medium voltage levels. The applications include use in laminators, mills, conveyors, pumps, fans, blowers, compressors, and so on industry is another driver for advancing multilevel inverter.

ML inverters can generate output voltages with extremely low distortion and lower change rate. Also, ML inverters draw input current with very low distortion, and generate smaller common-mode (CM) voltage, thus reducing the stress in motor bearings. In addition, using sophisticated modulation methods, CM voltages can be eliminated.

ML inverters generally use an array of power semiconductors and capacitor voltage sources to produce output voltages with stepped waveforms. The commutation of the switches permits the addition of the capacitor voltages, which reach high voltage at the output, while the power semiconductors can only withstand reduced voltages. The switches are typically controlled by a modulator implemented in digital circuits.

ML inverter circuits have been around for more than three decades. One cascade inverter connects separately DC-sourced full-bridge cells in series to synthesize a staircase ac output voltage. A diode-clamped inverter uses diodes to block the sources. The diode-clamped multilevel inverter is also called a neutral-point clamped (NPC) inverter as shown in FIG. 1 with an input voltage $V_{CC}$, and output levels a, b, and c for a conventional inverter.

There are a number of topologies for the analog circuits. In diode-clamped capacitor array, the DC-bus voltage is split into N levels by N−1 series connected bulk capacitors, and diodes are used to clamp the voltage at the switch to output. The middle point n of the capacitor array can be defined as the neutral point.

Space vector modulation (SVM) is a multilevel modulation technique that is widely used. It has been suggested that that the correct designation for the analytical tool to analyzing electrical machines has to be space phasor, instead of a space vector. The space phasor concept is mainly used for current and flux in analysis of electrical machines.

Recent progress in the semiconductor technology has made available fast commutating electronics power devices to be used with high voltages and currents, so extending the application field of voltage source inverters (VSI). Actually, it is not still possible to employ conventional VSI in the high power range due to commutation difficulties and reverse recovery high voltages.

Multilevel power converters are an interesting emerging technology for medium and high power applications including the fields of renewable energy sources and power quality issues as active filtering and reactive power compensators, e.g., static volt ampere reactive (VAR) compensators.

One fast modulation procedure for multilevel SVM three phase converters projects the line phases to a 3-dimensional Euclidean space, and uses a linear transformation to convert the switching states to a 2-dimensional non-orthogonal coordinate. The procedure is computational efficient. However, it requires that a 3 phase reference signal is generated.

Another method uses a modulator design with an iterative search procedure and can take up to N steps for an N−1 level modulator to reach the solution. The computation complexity is significant because of the non-linear trigonometrical operations. It also suffers high latency when the number of levels becomes high.

SUMMARY OF THE INVENTION

The embodiments of the invention provide a space vector representation in a three phase coordinate systems and some of its general properties. These properties lead to an extremely simplified, systematic approach in computing the coefficients of the triplets and pulse width modulation duty cycles. Specifically, a method generates space vector modulation signals for a multi-level power inverter using space vector pulse width modulation (SVPWM). A reference voltage and a triangle region for the reference voltage are determined. Vertices for a space vector that is closest to the reference voltage is outputted. Then, the vertices are adjusted so that the space vector is in a valid region of the triangle region. Lastly, the space vector modulation signals a, b, and c corresponding to the space vector in the valid region are outputted.

DETAILED DESCRIPTION OF THE PREFERRED EMBODIMENTS

Figure 1:
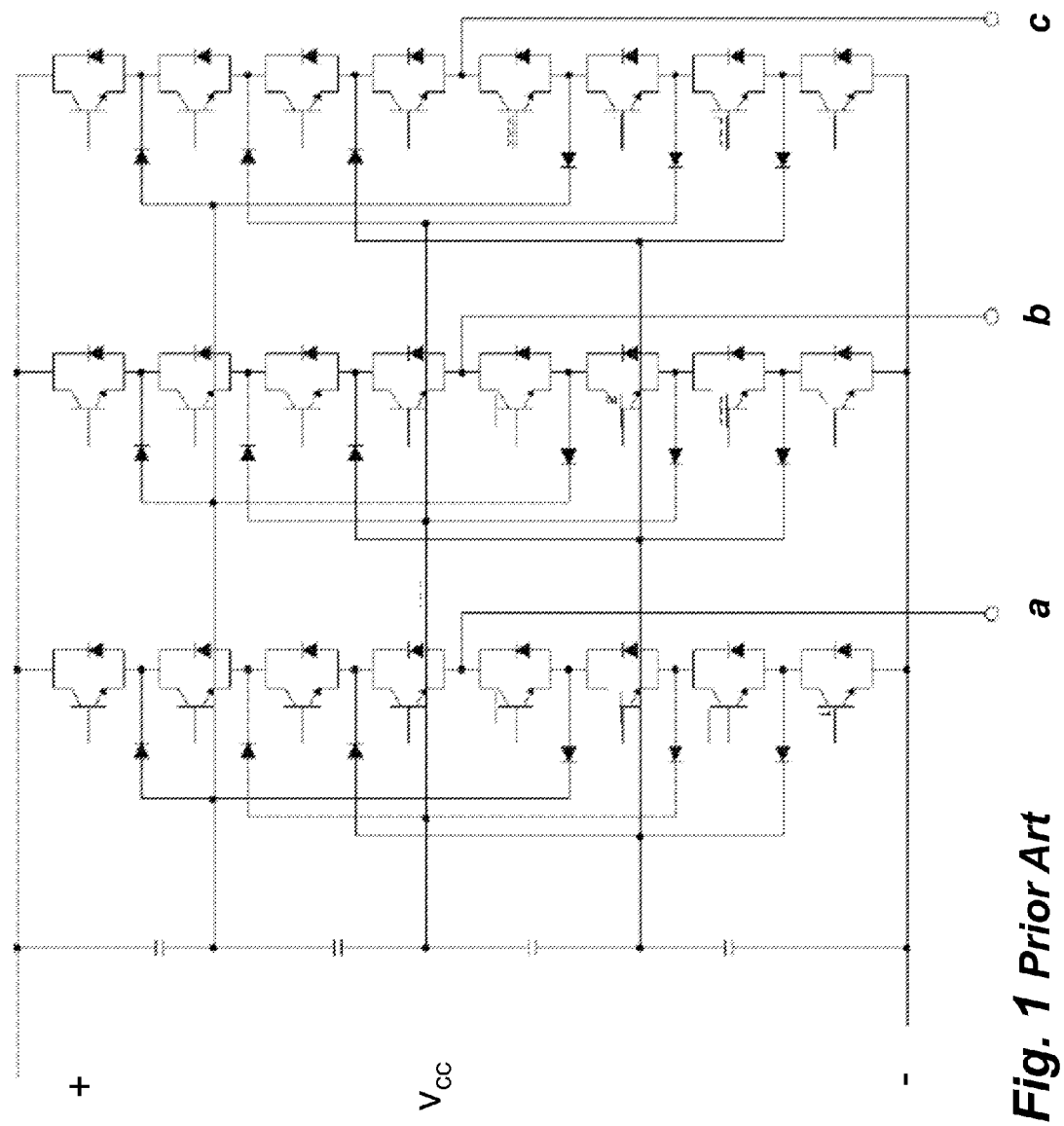
FIG. 1 is a schematic of a prior art neutral-point clamped (NPC) inverter.
Figure 2:
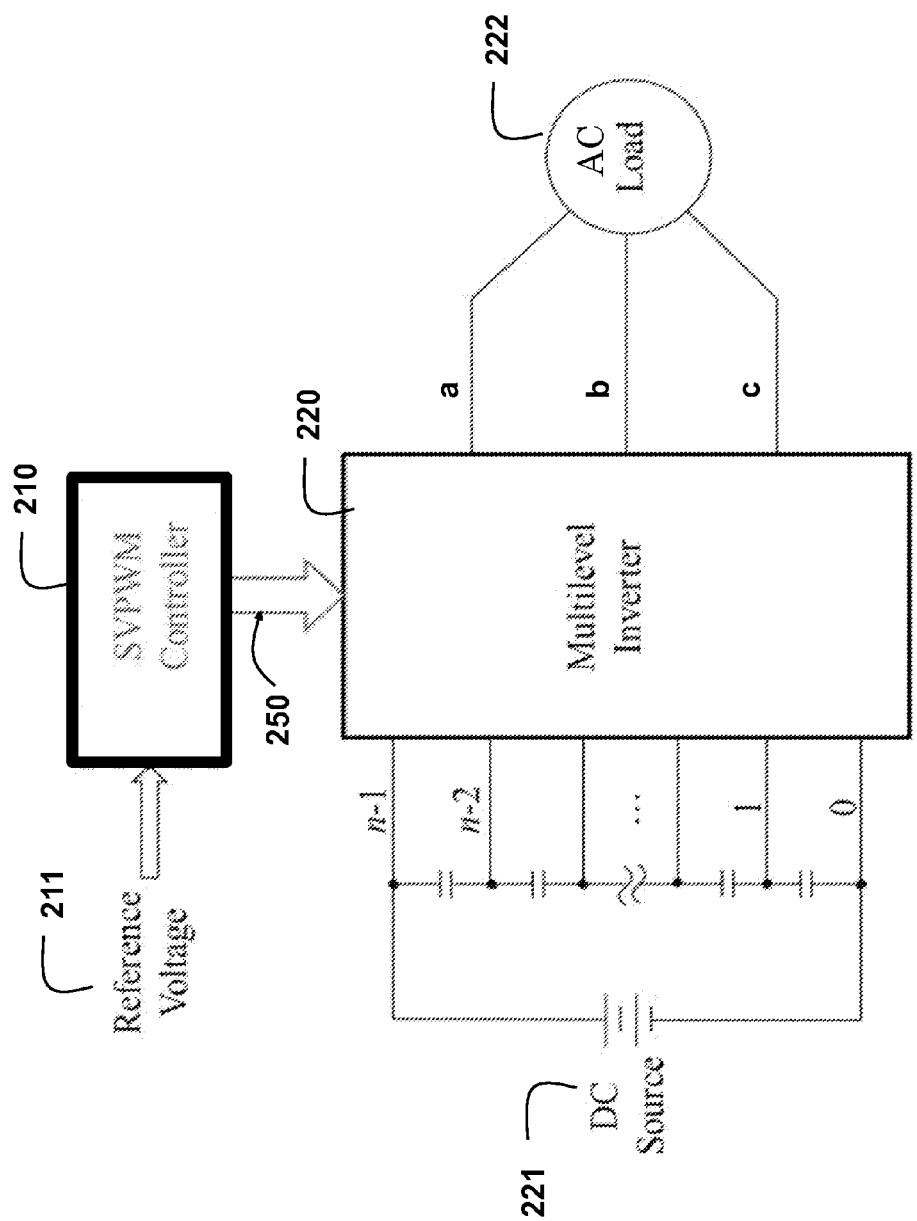
FIG. 2 is a block diagram of space vector pulse width modulation (SVPWM) controller for the NPC of FIG. 1 according to embodiments of the invention.

FIG. 2 shows a space vector pulse width modulation (SVPWM) controller 210 for a neutral-point clamped (NPC) inverter 220. The controller take a reference voltage 211 as input. The outputs of the SVPWM are space vector modulation signals a, b, and c 250, where a, b, and c correspond to the three phase of the AC signal. The inverter is connected between a DC source 221 and an AC load 222. The source can have N levels (0, 1, . . . , n−1). In contrast to the prior art where the number of levels is generally 2, the number of levels that can be specified for the inverter according to the embodiments can be arbitrary, e.g., 5, 7 or 25.

Space Vector Pulse Width Modulation (SVPWM) in 3 Phase Coordinate System

The most commonly used coordinate system to represent a vector in a two dimensional, or three dimensional space is a Cartesian coordinate system, where a vector V can be decomposed into the summation of vectors that are orthogonal to each others, i.e., $v = \vec{v}_x + v_y + v_z$.

In a three-phase coordinate system, a 2 dimensional vector V is treated as summation of three vectors that have $2\pi/3$ angle separation:

$$v = q_a \vec{a} + q_b \vec{b} + q_c \vec{c}, \quad (1)$$

where $$\begin{cases} \vec{a} = \alpha^0 = 1, \\ \vec{b} = \alpha = e^{j\frac{2\pi}{3}}, \\ \vec{c} = \alpha^2 = e^{-j\frac{2\pi}{3}} \end{cases} \quad (2)$$

and where $$\alpha = e^{j\frac{2\pi}{3}} = -\frac{1}{2} + \frac{\sqrt{3}}{2}j$$

is a rotating vector.

For simplicity, the 3-phase representation of a vector can be denoted using a 3-tuple $(q_a, q_b, q_c)$.

Properties of 3-Phase Coordinate System

Figure 3:
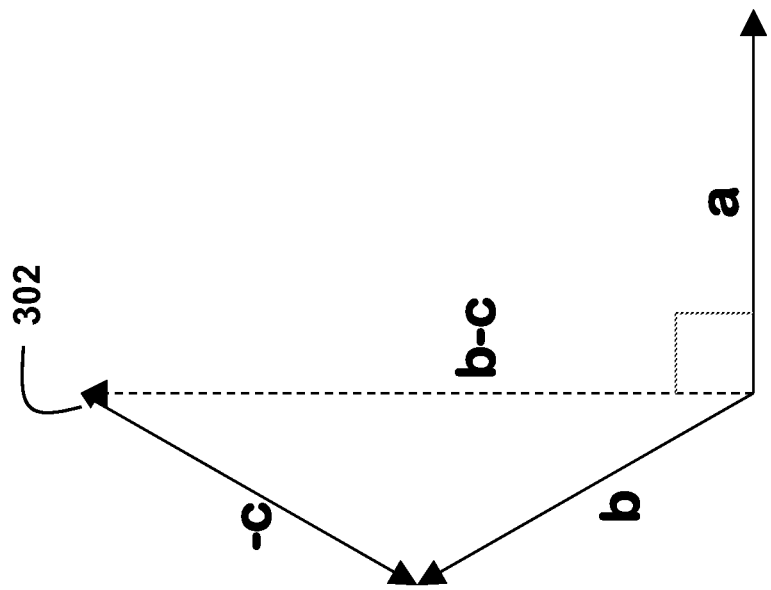
FIG. 3 is a schematic of properties of the 3-phase coordinate system used by embodiments of the invention.
Figure 3:
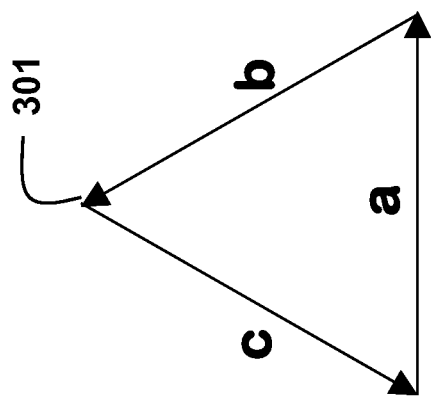

As shown in FIG. 3, two important properties of the 3-phase coordinate system serve as the basis for our invention. We realize that unlike the Cartesian system, base vectors in the 3-phase system are not orthogonal to each other. This implies that the representation of a given vector is not unique. We describe the redundancy in the system and how to exploit the redundancy in greater detail below. The two properties 301-302 respectively are $$\vec{a} + \vec{b} + \vec{c} = 0 \quad (3)$$

$$(\vec{b} - \vec{c}) \perp \vec{c}. \quad (4)$$

FIG. 3 shows the redundancy in the 3-phase coordinate system. Clearly, $(a+\delta, b+\delta, c+\delta)$ and $(a, b, c)$ represent the same vector. Equation (4) allows us to transform a 3-phase representation of a vector to a Cartesian representation. Recognizing that $$(\vec{b} - \vec{c}) = \frac{\sqrt{3}}{2}i, \quad (5)$$

we can see that the vector $v = v_x + iv_y$ has the 3-phase representation as $$\left( v_x, \frac{2v_y}{\sqrt{3}}, \frac{-2v_y}{\sqrt{3}} \right).$$

Fast Space Vector Modulator

The main objective for a space vector modulator is to generate a pulse width modulated vector signals that can closely approximate the desired space vector. Additionally, it is possible to add additional features for signal conditioning We focus on the procedure for vector generation and pulse width calculation.

Locating the Closest Vertices

An arbitrary space vector can be represented in a 3-phase coordinate system. However, in an inverter, the modulator can only output discrete values. The range of the values are non-negative and has a limited range, where the range is determined by the number of levels, e.g., the number of switches in the NPC. For an N-level inverter, the permissible output vectors are $$v_o = v_c(ka + mb + nc),$$

where $$v_c = \frac{V_{DC}}{N - 1}$$

is the nominal voltage across k,m,n are integers of the space vector, and $\{k, m, n\} \in [0, N-1]$. If we define a normalized vector $V_{ref} = v_0 / v_c$, then we can omit $v_c$ in the our analysis.

Figure 4:
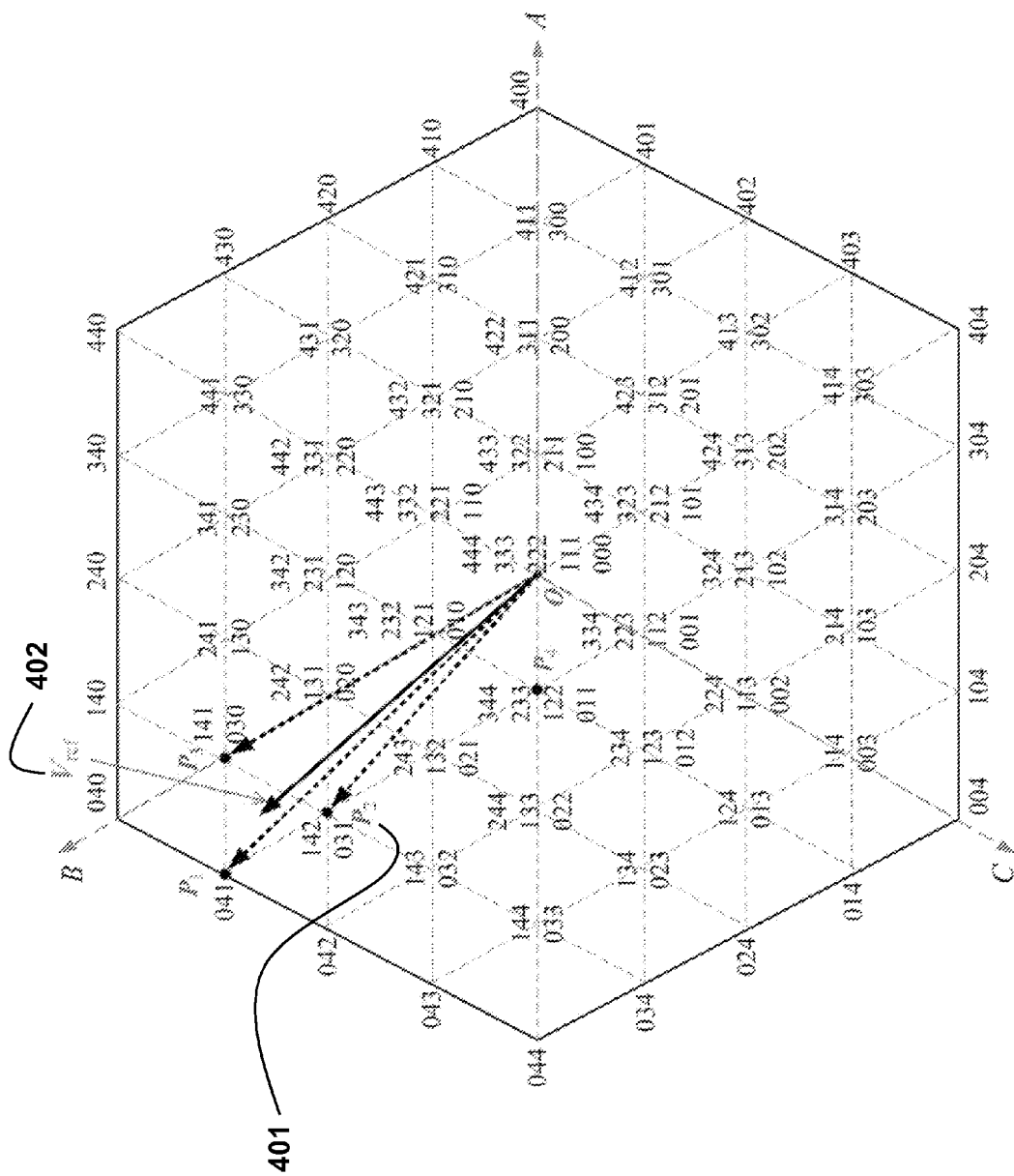
FIG. 4 is a space vector diagram of a five-level inverter according to embodiments of the invention.
Figure 5:
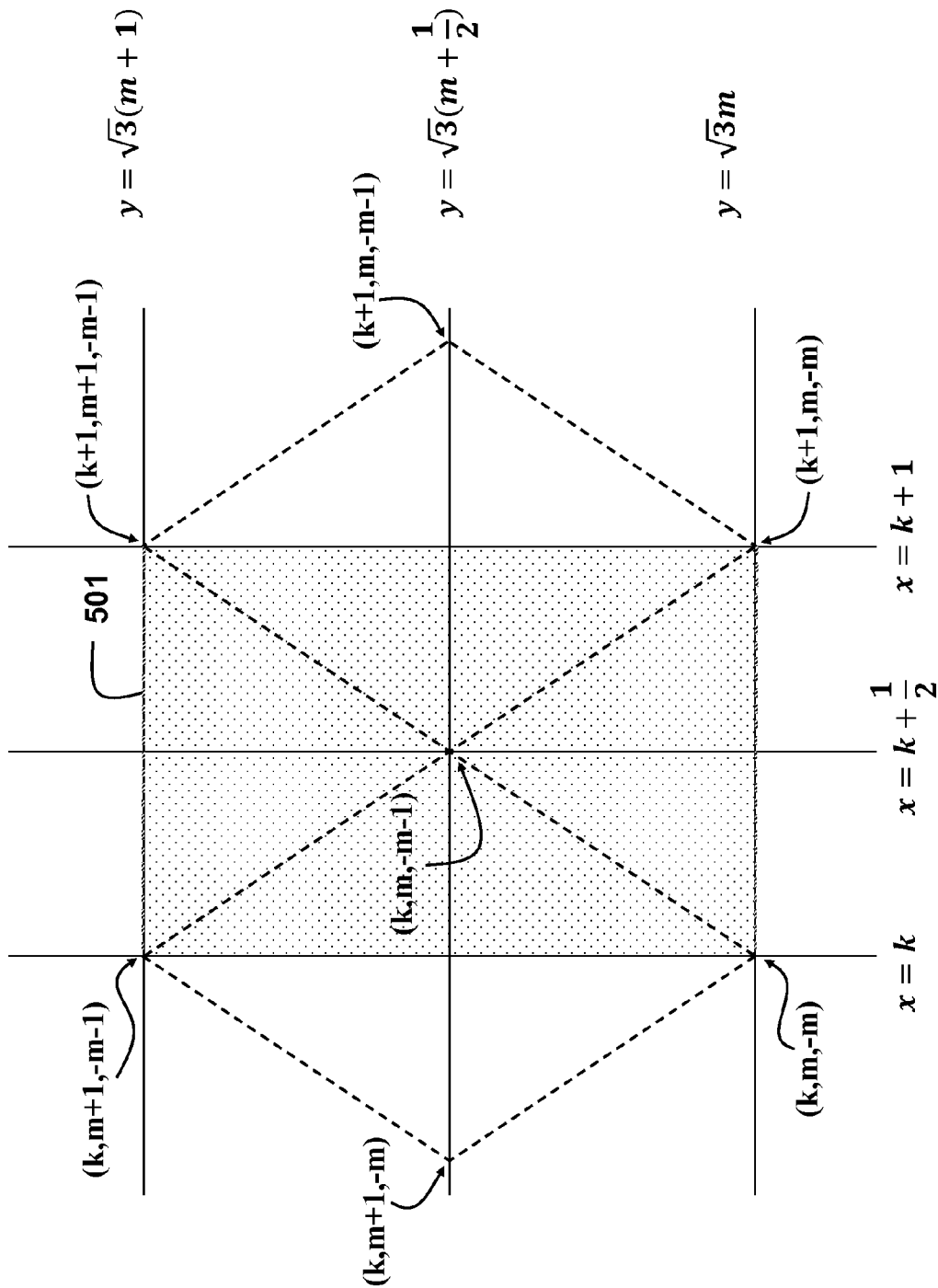
FIG. 5 is a schematic of a rectangular region where reference voltage $V_r$ is located.

FIG. 4 shows permissible output vertices for a 5 level inverter. In FIG. 4, the output voltage $V_r$ does not fall on to any of the vertices and therefore, the modulator cannot output exactly $V_r$. Therefore, the modulator outputs an approximation of $V_r$. A simple approximation is to find a vertex that is the closest to $V_r$ for each $V_r$ sample, i.e., find a $\hat{V}$ such that $$\arg\min_{\hat{V}} \|\hat{V} - V_r\|. \quad (6)$$

That is, we find the vertex that is closest to the true desired output vector. In the example shown in FIG. 4, $P_2$ 401 appears to be the closest vector. This, however, results in an error in each sample and can produce an output waveform that is not acceptable.

A more sophisticated approach is approximate each output with three surrounding vertices. In the example in FIG. 4, the vertices are $P_1$, $P_2$ and $P_3$. Within the sampling period, the modulator outputs three vectors for corresponding duty cycles, and hence the pulse width modulation.

The objectives of the modulator design is to efficiently find the three (losest) vertices that surround the designed $V_r$ ($V_{ref}$) 401, and the corresponding duty cycles. We describe the search for vertices and computation of duty cycle below. The duty cycle the proportion of ON time.

As shown in FIG. 3, we try to find three vertices that are closest to $V_r$ and enclose $V_r$. Note that $V_r$ can be represented in a Cartesian coordinate system as $x = \text{Re}(V_r)$, and $y = \text{Jm}(V_r)$. Assume $N \to \infty$, it can be easily seen that all vertices can be represented by either $(k, m, -m)$, or $(k, m, -m-1)$. In the Cartesian system, the vertices represent the following vertices respectively:

$$(k, m, -m) = k + j\sqrt{3}\, m, \text{ and} \quad (7)$$

$$(k, m, -m-1) = \left(k + \frac{1}{2}\right) + j\sqrt{3}\left(m + \frac{1}{2}\right), \quad (8)$$

We can determine a rectangular region 501 where $V_r$ is located. If the region is defined by the lower-left vertex of (k,m,−m) and upper-right vertex (k+1, m+1, m−1), then k and m can be determined as $$k = \lfloor \operatorname{Re}(V_r) \rfloor \quad (9)$$

$$m = \left\lfloor \frac{\operatorname{Im}(V_r)}{\sqrt{3}} \right\rfloor, \quad (10)$$

where Re indicates the real part and I indicates the imaginary part.

If $V_r$ is in the rectangle, it falls within one of the six triangles shown in FIG. 4.

If we define $\Delta x \triangleq \operatorname{Re}(V_r - k)$ and $$\Delta y \triangleq \operatorname{Im}\left(\frac{V_r}{\sqrt{3}} - m\right)$$

The boundaries of the triangles are $$\Delta y - \frac{1}{2} = 0 \quad (11)$$

$$\Delta x - \Delta y = 0 \quad (12)$$

$$\Delta x + \Delta y - 1 = 0. \quad (13)$$

Figure 6:
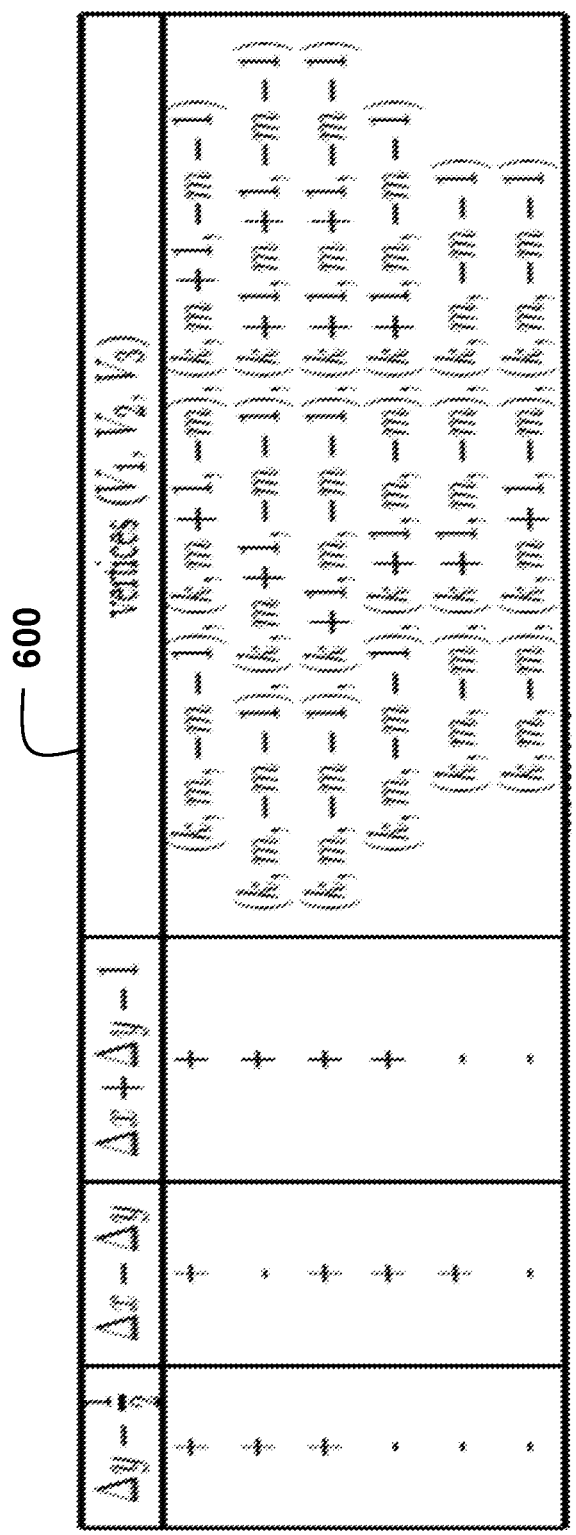
FIG. 6 is table of boundary conditions for triangles in FIG. 5.

The three closest vertices to $V_r$ are determined by testing $\Delta x$ and $\Delta y$ against these three boundary conditions. The table 600 in FIG. 6 shows the corresponding vertices.

Determining Pulse Widths

To representing the modulation vector $V_r$ with the three space vectors determined following the procedure described above, pulse width modulation is used. In a given period T, the modulator outputs the three vectors $V_1$, $V_2$ and $V_3$ for fractions of a period. The durations are $T_1$, $T_2$, and $T_3$ respectively.

The complete fidelity is achieved by selecting the duty cycles such that the average voltage equals the desired output voltage. Therefore, the following condition is satisfied:

$$\frac{\sum_{i=1}^{3} w_i v_1}{\sum_{i=1}^{3} w_i} = v_o. \quad (14)$$

Error Vector

Figure 7:
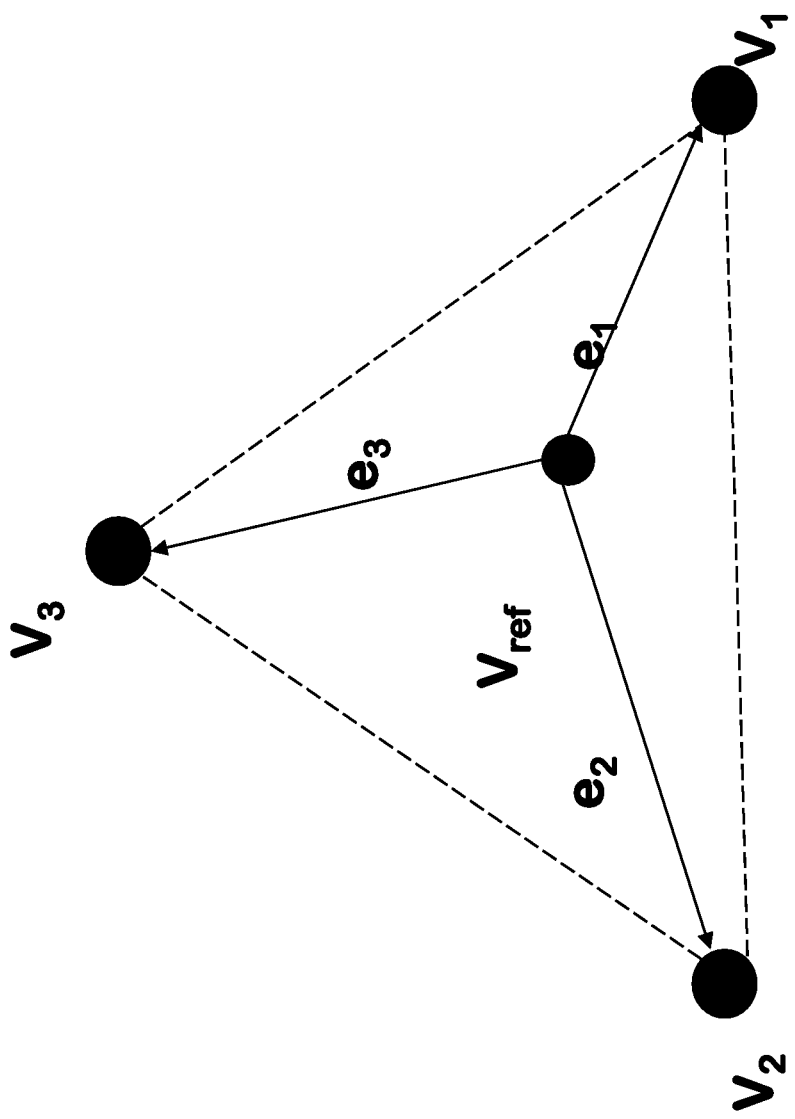
FIG. 7 is a schematic of three error vectors according to embodiments of the invention.

As shown in FIG. 7, if we define the error vector $e_i$ as the difference between a quantized vector $v_i$ and the true vector, $$e_i = v_i - v_o,$$

equation (14) can be rewritten as $$\sum_{i=1}^{3} w_i e_i = 0, \quad (15)$$

$$\sum_{i=1}^{3} w_i = 1, \quad (16)$$

and equation (15) can be expressed as $$\begin{cases} \sum_{i=1}^{3} w_i x_i = 0, \\ \sum_{i=1}^{3} w_i y_i = 0 \end{cases} \quad (17)$$

Combining equation (17) and equation (16), $w_i$ is the solution of the following linear equations $$\underbrace{\begin{bmatrix} x_1 & x_2 & x_3 \\ y_1 & y_2 & y_3 \\ 1 & 1 & 1 \end{bmatrix}}_{P} \underbrace{\begin{bmatrix} w_1 \\ w_2 \\ w_3 \end{bmatrix}}_{W} = \underbrace{\begin{bmatrix} 0 \\ 0 \\ 1 \end{bmatrix}}_{N}, \quad (18)$$

where $$W = P^{-1} N = \frac{1}{\det(P)} \begin{bmatrix} y_3 x_2 - y_2 x_3 \\ y_1 x_3 - y_3 x_1 \\ y_2 x_1 - y_1 x_2 \end{bmatrix}. \quad (19)$$

where $\det(P) = x_1 y_2 - x_1 y_3 - y_1 x_2 + y_1 x_3 + y_3 x_2 - y_2 x_3$ is the determinant of square matrix P.

The weights $w_i$ are real and non-negative. In practice, pulse width modulation is implemented in a clocked circuit with an oversampling rate of K. The clock frequency is K times the sampling frequency of v, or, the duration T is partitioned into K slices. In such as case, the weights are approximated as $$w_i = \operatorname{round}(w_i \times K).$$

Method for Generating Control Signal

Figure 8:
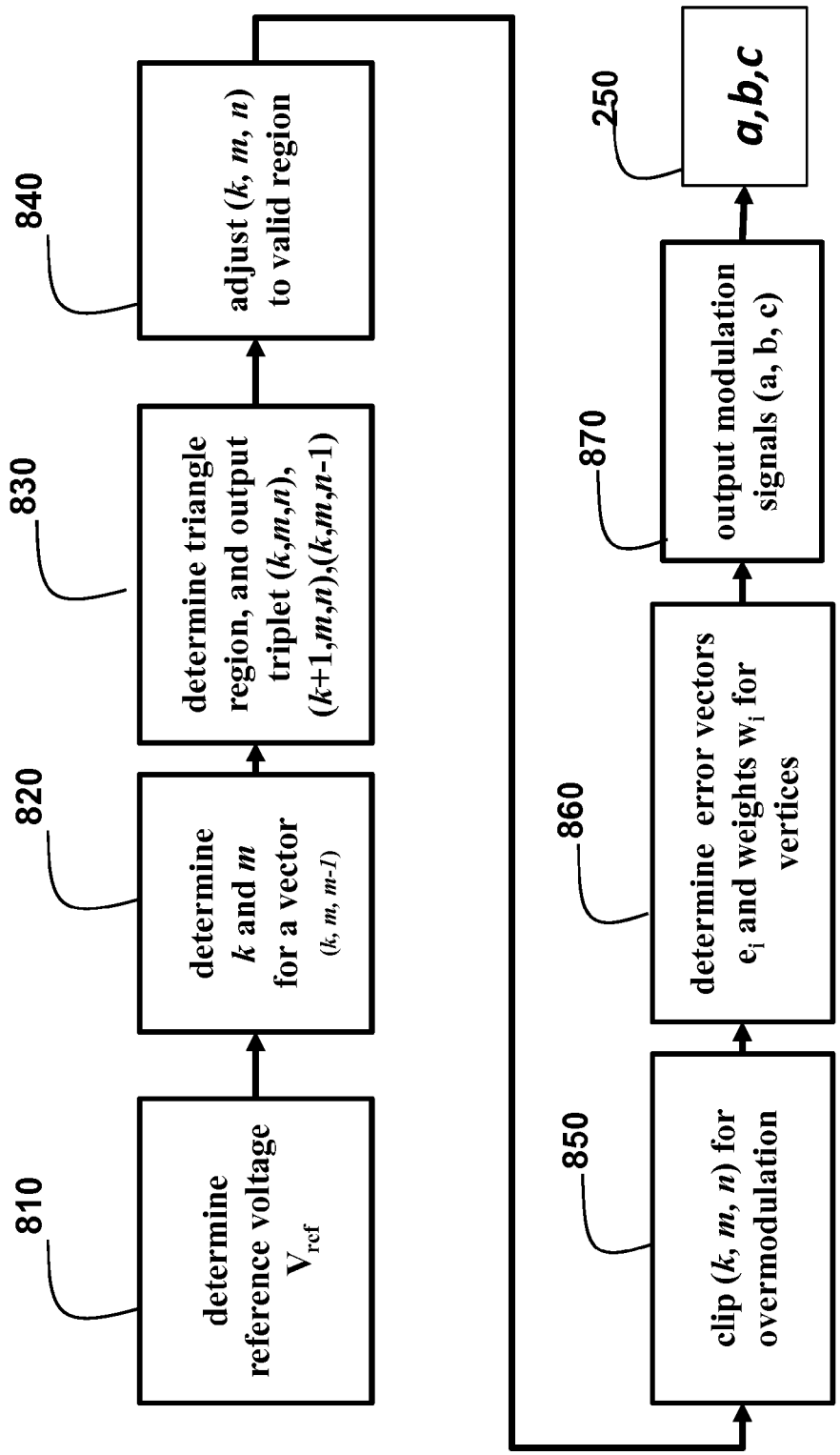
FIG. 8 is a block diagram of a method for generating space vector modulation signals according to embodiments of the invention.

FIG. 8 shows the steps of a method for generating space vector modulation signals (a, b, c) 250 for a multilevel inverter 220. The signals are generated in the space vector pulse width modulation (SVPWM) controller 210.

A reference voltage $V_{ref}$ 211 is determined 810. If the waveform is sinusoidal, then the output is $V_{ref} = \exp(jwt)$, where j represents an imaginary part, w represents an angular velocity −2πf) . . . , f is the frequency, and t is time.

Next, values of k and in for a vector (k, m, m−1) are determined 820 using equation (9) and (10).

A triangle region where $V_{ref}$ belongs is determined 830 using equation (11), (12), and (13). The vertices (k, m, n), (k+1, m, n), and (k, m, n−1) that are closest to the reference voltage are output.

The vertex (k, m, n) is adjusted 840 to (k', m', n')=(k+D, m+D, n+D) such that k', m' and n' are in a valid region [0, N−1], where N is a level of modulation in the inverter If it is not possible to determine whether the vertex (k', m', n') is in a valid region, then the output signal (k, m, n) is clipped 850 for overmodulation, and the value that exceeds the maximal level of modulation N is replaced by N.

The error vectors $e_i = e_1$, $e_2$, and $e_3$ for each vertex and the weight $w_i$ of each vertex are determined 860 using equation (18) and (19). Based on $w_i$, the duty cycle of each set of output values can be determined, and the modulation signals (a, b, c) 250 can be output 870.

The steps of the method can be performed in a processor connected to memory and input/output interfaces as known in the art.

Effect of the Invention

We describe a SVPWM-based 3 phase inverter by reviewing mathematical foundation of a 3-phase coordinate system and vector representation in such a coordinate system. We show two important properties of the system, which serve as the basis of the method. By exploiting these two important properties, we provide a method to determine coefficients of the vector efficiently. The method determines the coefficients and modulation duty cycles in a single step and does not involve any complicated non-linear trigonometric functions. As a result, the method is extremely computation efficient.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for generating space vector modulation signals for a multilevel power inverter using space vector pulse width modulation (SVPWM), comprising steps of:
    determining a reference voltage;
    determining a triangle region for the reference voltage;
    determining vertices for space vectors that enclose the reference voltage;
    determining duty cycles of the space vectors;
    adjusting the vertices for the space vector so that control outputs are in a valid region;
    outputting space vector modulation signals $v_1$, $v_2$, and $v_3$ corresponding to the duty cycles and the space vectors in the valid region, wherein the steps are performed in the multi-level power inverter; and
    determining three vertices closest to the reference voltage based on $$k = \lfloor \operatorname{Re}(V_r) \rfloor$$

$$m = \left\lfloor \frac{\operatorname{Im}(V_r)}{\sqrt{3}} \right\rfloor,$$

wherein Re indicates a real part and Im indicates an imaginary part of the reference voltage, and k, m, n are integers of the space vectors.

2. The method of claim 1, further comprising:
    computing an error vector for each vertex.

3. The method of claim 2, further comprising:
    determining the duty cycle for each vertex based on the error vectors.

4. The method of claim 1, further comprising:
    connecting the multi-level power inverter between a DC source and an AC load.

5. The method of claim 1, wherein
    the space vector is represented by $v = q_a \vec{a} + q_b \vec{b} + q_c \vec{c}$ using three tuples $(q_a, q_b, q_c)$ of integers, and $$\vec{a} + \vec{b} + \vec{c} = 0, \text{ and}$$

$$(\vec{b} - \vec{c}) \perp \vec{a},$$

where $\rightarrow$ is a vector notation, and $\perp$ is an orthogonality notation.

6. The method of claim 1, wherein a number of level is an arbitrary number greater than 2.

7. The method of claim 1, further comprising:
    determining the triangle region according to $$\Delta y - \frac{1}{2} = 0,$$

$$\Delta x - \Delta y = 0, \text{ and}$$

$$\Delta x + \Delta y - 1 = 0,$$

wherein $\Delta x = \operatorname{Re}(V_r - k)$ and $$\Delta y \triangleq \operatorname{Im}\left(\frac{V_r}{\sqrt{3}} - m\right).$$

* * * * *